United States Patent Office 2,953,515
Patented Sept. 20, 1960

2,953,515

HYDROCRACKING OF A GAS OIL WITH A CATALYST CONSISTING OF OXIDES OF VANADIUM AND MOLYBDENUM AND METALLIC COBALT DEPOSITED ON GAMMA ALUMINA

William C. Lanning, Bartlesville, Okla., assignor to Phillips Petroleum Company, a corporation of Delaware No Drawing. Filed July 1, 1957, Ser. No. 668,926

3 Claims. (Cl. 208—112)

This invention relates to an improved hydrocarbon conversion catalyst and to a process for hydrotreating gas oils. A specific aspect of the invention is concerned with a method of preparing an improved hydrocarbon conversion catalyst particularly suited to the hydrocracking of heavy gas oils.

In the hydrocracking of gas oils, one of the problems involved is that of developing a catalyst of high cracking activity and low coke laydown characteristics. Generally a catalyst of high cracking activity effects a substantial amount of conversion to coke. In the hydrocracking of gas oil, it is desirable to convert a substantial amount of the feed to olefins and avoid hydrogenation of the olefins to saturated hydrocarbons. It is also desirable that the catalyst have good desulfurization activity along with high cracking activity and low conversion to coke. I have developed a catalyst and a method of preparing the same which has improved characteristics in the hydrocracking of heavy gas oils.

It is an object of the invention to provide an improved catalyst and process for preparing the same. Another object is to provide an improved hydrocracking catalyst which has high cracking and desulfurization activity with low conversion to coke. A further object is to provide an improved process for the conversion of hydrocarbon to more valuable fluid hydrocarbons. It is also an object of the invention to provide an improved process for hydrocracking a heavy gas oil. Other objects of the invention will become apparent from a consideration of the accompanying disclosure.

The improved catalyst comprises cobalt molybdate on alumina in which vanadium oxide has been incorporated. This catalyst when made in accordance with the process of the invention has increased cracking activity, low coke laydown, and good desulfurization activity at mild hydrocracking conditions. My catalyst is also unique in that a substantial proportion of the olefins produced by cracking of the gas-oil components are not hydrogenated, although good desulfurization activity is maintained during the hydrocracking. The catalyst comprises a porous active gamma-alumina support or base having dispersed thereon the oxides of vanadium and molybdenum and metallic cobalt. The composite is pretreated by partially reducing the oxides before use. The amount of the vanadium, cobalt, and molybdenum in the catalyst may range from 1 to 10 percent calculated as metal, the balance being alumina; however, it is preferred that the vanadium be in the range of 2 to 3 weight percent of the catalyst, the cobalt from 2 to 4 weight percent, and the molybdenum from 3 to 6 percent.

In preparing the catalysts of the invention, an active porous aluminum oxide having substantial pore volume is impregnated with an aqueous solution of vanadate followed by draining, drying, and calcining the impregnated support; thereafter the calcined composite is impregnated with a solution of a mixture of cobalt nitrate and ammonium molybdate. (This solution may be prepared as described in U.S. Patent 2,486,361.) The impregnated vanadia-alumina is drained, dried, and calcined so as to convert the metal compounds to oxides. The calcined composite containing cobalt and molybdenum oxides on vanadia-alumina is then partially reduced by treatment with hydrogen at an elevated reducing temperature. A preferred method is to reduce the composite in hydrogen at a temperature in the range of 600 to 1100° F.

Various types of active aluminas from a number of sources may be used for the alumina base of the catalyst. Synthetic alumina gel, partially dehydrated naturally occurring hydrous alumina, as well as precipitated alumina trihydrate properly dehydrated so as to maintain the alumina, at least in part, in the gamma form, may be used as the support for the other constituents of the catalyst.

It is also feasible to impregnate the alumina base in a variety of ways other than the manner specifically described herein. The impregnation may be effected from a solution containing all three added metal compound promoters, such as from an aqueous solution of ammonium vanadate, ammonium molybdate, and cobalt nitrate; or the impregnation may be by successive impregnation with separate individual solutions of the three metal compounds followed by calcination after each impregnation. Another variation comprises successive impregnations of vanadia-alumina with an aqueous solution of the other two compounds, such as ammonium molybdate and cobalt nitrate, with calcination of the composite between impregnations. Or the alumina support may be impregnated by soaking same in or with a solution of all three metal compounds followed by calcination and repeating the soaking and calcination steps one or more times to obtain the desired concentration of the metals on the support.

The reduction of the mixed oxides in $H_2$ at elevated temperatures (600–1100° F.) reduces the vanadium and molybdenum oxides to the lower oxide forms and reduces most of the cobalt oxide to the metal.

The reduced catalyst of the invention is an improved catalyst for hydrocracking of heavy gas oils. Increased cracking activity and low coke laydown is maintained using this catalyst at mild hydrocracking conditions. The range of operating conditions for hydrocracking using this catalyst are:

|  | Preferred | Broad |
|---|---|---|
| Temperature, degrees F | 725–825 | 650–850 |
| Pressure, p.s.i.g. | 400–1,000 | 200–2,000 |
| LHSV | 0.5–2.0 | 0.1–10 |
| Cu. ft. $H_2$/bbl. oil | 500–2,000 | 100–10,000 |

Gas oils having a boiling range of 350 to 1100° F. are suitable feeds for the hydrocracking process. Such feeds usually contain up to about three weight percent sulfur.

The following specific example is presented to illustrate the invention but is not to be construed as unnecessarily limiting the same.

*Example*

A group of five catalysts were tested for 12 hours in hydrotreating a Borger 400–1100 F. gas oil (0.52 wt. percent sulfur; 0.22 wt. percent Ramsb. C residue; 31.1 °API @ 60° F.) at 500 p.s.i.g., 1000 $CFH_2$ per bbl. of oil, 750° F. treating temperature, and a LHSV of 1.0. The catalysts are described below and the desulfurizing activity and conversion to coke for each catalyst are shown in the table.

(1) A commercial catalyst consisting essentially of 6.5 weight percent of molybdena (calculated as metal) deposited on active gamma alumina;

(2) A catalyst consisting essentially of 4.7 weight percent Co deposited on active gamma alumina;

(3) A catalyst consisting essentially of 4.3 weight percent vanadia (calculated as metal) deposited on active gamma alumina;

(4) A catalyst consisting essentially of 2.4 weight percent Co and 5.0 weight percent molybdena (calculated as metal) deposited on active gamma alumina; and (5) A cobalt molybdate on vanadia-alumina catalyst containing 1.6 wt. percent Co, 2.0 wt. percent Mo in lower oxide form, and 1.1 wt. percent V in lower oxide form.

Twelve hour tests with Borger 400–1100° F. gas oil (0.52 wt. percent sulfur, 0.22 wt. percent Ramsb. C residue, 31.1 °API @ 60° F.) at 500 p.s.i.g., 1000 CFH$_2$ per bbl. oil, 750° F., 1 LHSV.

| Catalyst | Percent Desulfurization, avg. | Coke (Wt. percent Catalyst) |
|---|---|---|
| 1. Mo—Al$_2$O$_3$ | 73 | 1.5 |
| 2. Co—Al$_2$O$_3$ | 51 | 2.0 |
| 3. V—Al$_2$O$_3$ | 46 | 0.7 |
| 4. CoMo—Al$_2$O$_3$ | 74 | 1.5 |
| 5. CoMoV—Al$_2$O$_3$ | 67 | 0.6 |

The cobalt molybdena-vanadia on alumina catalyst showed a lower coke-forming tendency than cobalt-molybdena in short hydrotreating tests with Borger gas oil, in fact, less than half as much coke at about the same sulfur conversion level.

Certain modifications of the invention will become apparent to those skilled in the art and the illustrative details disclosed are not to be construed as imposing unnecessary limitations on the invention.

I claim:

1. A process for hydrocracking a sulfur-containing gas oil boiling in the range of about 350 to 1100° F. which comprises contacting said gas oil under mild hydrocracking conditions including a temperature in the range of 650 to 850° F., a pressure in the range of 200 to 2000 p.s.i.g., at least 100 s.c.f. of H$_2$ per bbl. of liquid feed, a range of 0.1 to 10 LH space velocity with a catalyst consisting essentially of porous active gamma alumina having deposited thereon a reduced mixture of the oxides of vanadium and molybdenum and metallic cobalt so as to substantially reduce the sulfur content of said gas oil and produce a substantial proportion of olefins which remain unhydrogenated in the cracked product.

2. The process of claim 1 wherein the catalyst contains vanadium in the range of 2 to 3 weight percent, cobalt in the range of 2 to 4 weight percent, and molybdenum in the range of 3 to 6 weight percent.

3. The process of claim 1 wherein said catalyst contains from 1 to 10 weight percent of each of V, Co, and Mo.

References Cited in the file of this patent

UNITED STATES PATENTS

| 2,625,519 | Hartig | Jan. 13, 1953 |
| 2,700,014 | Anhorn et al. | Jan. 18, 1955 |
| 2,817,626 | Mabry et al. | Dec. 24, 1957 |
| 2,847,358 | Kemp et al. | Aug. 12, 1958 |